Feb. 4, 1958 J. E. McDONALD ET AL 2,822,132
AIR TEMPERATURE AND VOLUME CONTROLS
Filed Sept. 28, 1954 2 Sheets-Sheet 1
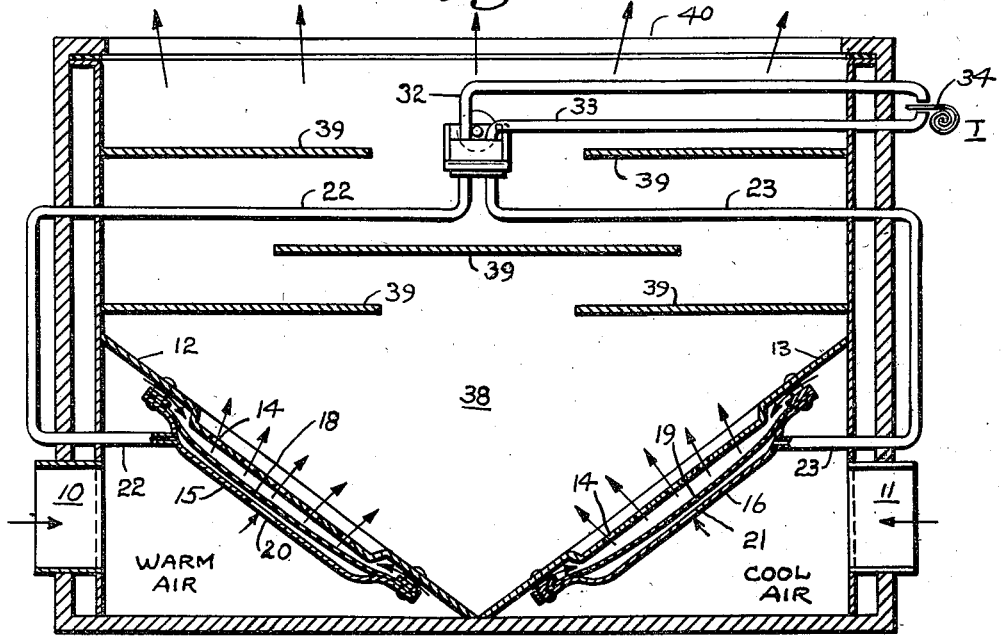
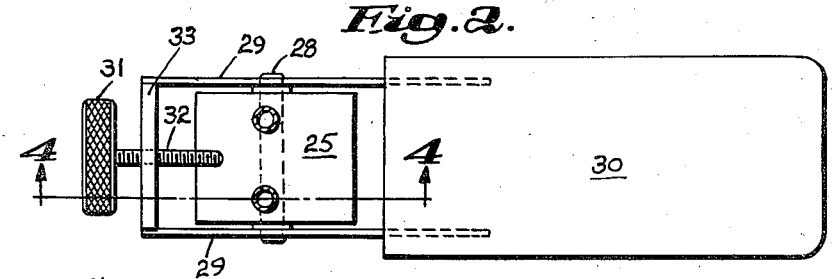
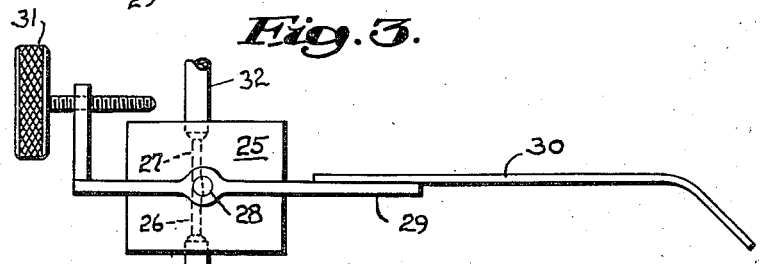
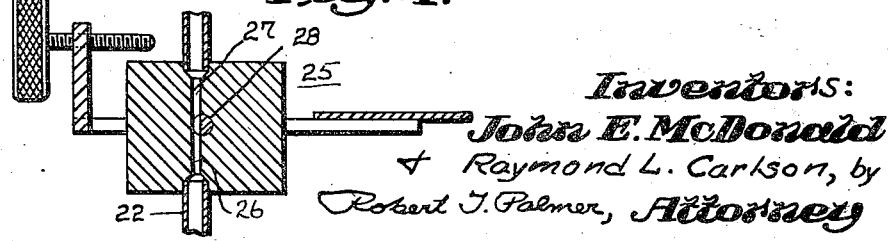
Inventors:
John E. McDonald
& Raymond L. Carlson, by
Robert J. Palmer, Attorney

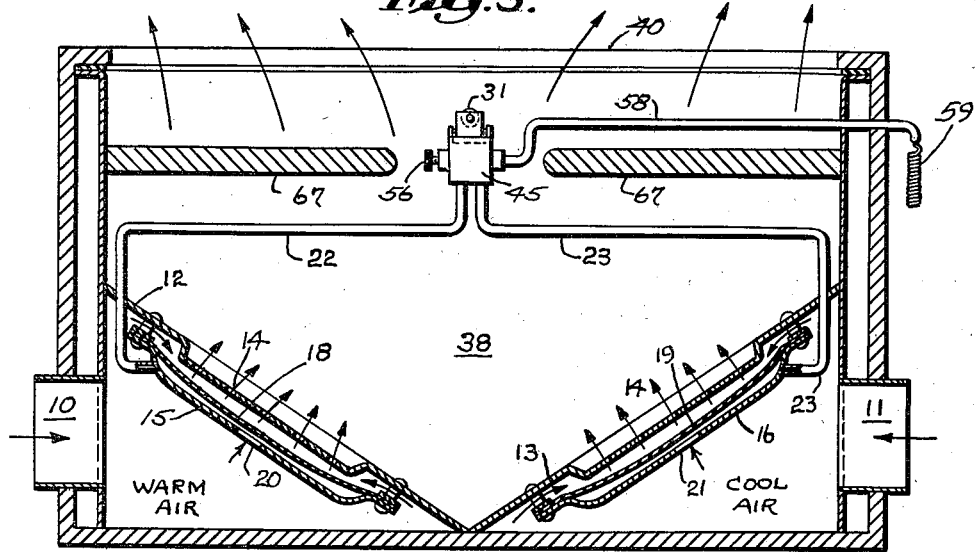
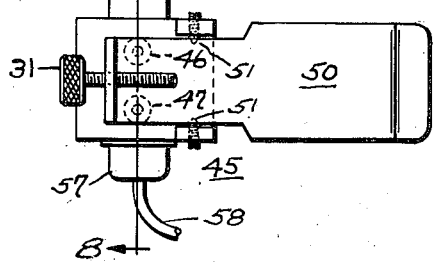
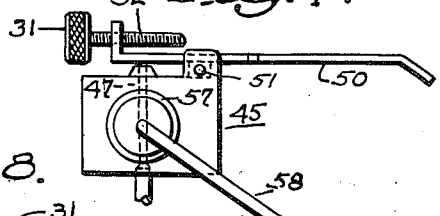
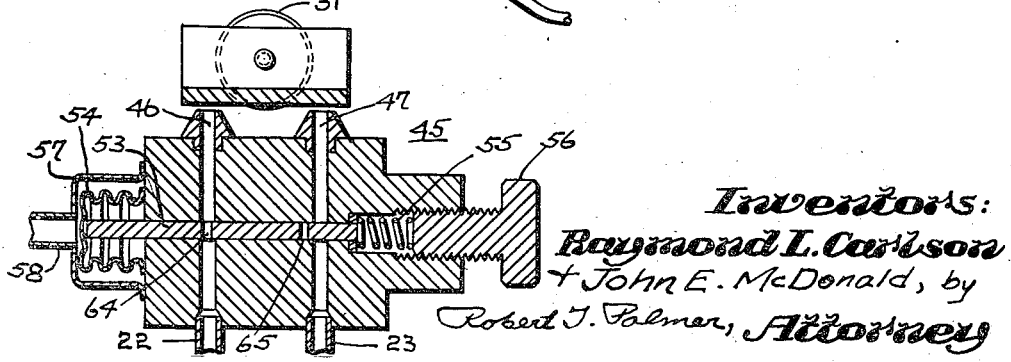

United States Patent Office 2,822,132
Patented Feb. 4, 1958

2,822,132

AIR TEMPERATURE AND VOLUME CONTROLS

John E. McDonald, Newton, and Raymond L. Carlson, Canton, Mass., assignors to Westinghouse Electric Corporation, East Pittsburgh, Pa., a corporation of Pennsylvania Application September 28, 1954, Serial No. 458,920

4 Claims. (Cl. 236—13)

This invention relates to air conditioning apparatus, and relates more particularly to air temperature and volume controls for air distributing units used with such apparatus.

As disclosed in the co-pending application of J. E. McDonald, Serial No. 327,360, now Patent No. 2,793,-812, which was filed on December 22, 1952, when local air distributing units are supplied with conditioned air from a central source, load changes may cause the volume of air supplied to a local unit to vary greatly beyond the dampering variation provided by its associated thermostat. Since it is desirable that each local unit deliver a constant volume of air into the space served, it has been the practice to provide additional controls for maintaining such constant air volumes. Such additional controls usually require an external source of compressed air to operate their associated dampers.

This invention provides dampering units for maintaining air temperature and volume constant, and uses the pressure in the conditioned air stream for operating the dampers of the units.

In one embodiment of this invention used for maintaining a constant air temperature and a constant air volume at the outlet of an air distributing unit supplied with separate warm and cool air streams, warm and cool air inlet plates have warm and cool dampers respectively, consisting of flexible diaphragms lined-up with the inlet sides of the inlet plates, the latter having air outlet perforations therein. Warm air under pressure is supplied into a warm air chamber behind the warm air diaphragm, and cool air under pressure is supplied into a cool air chamber behind the cool air diaphragm. The air in the warm and cool air chambers is bled to atmosphere through valves adjusted by a volume responsive control, and past a bleeder adjusted by a temperature responsive control. An increase in the volume of air bled from one of the chambers results in less air pressure behind its associated diaphragm, permitting the latter's movement away from its associated outlet plate, and permitting a larger volume of air to pass out through the perforations in the outlet plate. A decrease in the volume of air bled from one of the chambers results in an increase in the air pressure behind its associated diaphragm, causing the latter to move closer to its associated outlet plate, and reducing the volume of air passed out through the perforations in the outlet plate. The bleeder acts to increase the volume of air bled from one of the chambers while correspondingly increasing the volume of air bled from the other of the chambers so as to maintain a constant temperature. The valves adjusted by the volume responsive control adjust the volume of air bled from both chambers for maintaining a constant air volume.

In another embodiment of this invention, the bleeder is adjusted by the volume responsive control, and valves between the bleeder and the warm and cool air chambers are adjusted by the temperature responsive control for increasing the volume of air supplied from behind one diaphragm to the bleeder while decreasing the volume of air supplied from behind the other diaphragm to the bleeder.

An object of this invention is to improve controls used for maintaining constant the volume and temperature of the air discharged from an air distributing unit.

This invention will now be described with reference to the annexed drawings, of which:

Fig. 1 is a side section of an air distributing unit embodying this invention;

Fig. 2 is an enlarged plan view of the air volume responsive control of Fig. 1 with the tubes leading to the bleeder shown in section;

Fig. 3 is a side elevation of Fig. 2;

Fig. 4 is a sectional view along the line 4—4 of Fig. 2;

Fig. 5 is a side section of another air distributing unit embodying this invention;

Fig. 6 is a plan view of the air volume responsive control of Fig. 5;

Fig. 7 is a plan view of Fig. 6, and

Fig. 8 is a sectional view along the line 8—8 of Fig. 6.

Description of Figs. 1–4

The air distributing unit shown by Fig. 1 is of the general type disclosed in the co-pending application Serial No. 249,085, now Patent No. 2,727,454, of W. C. Jones, which was filed on October 1, 1951, and has a warm air duct connection 10, and a cool air duct connection 11. The two front plates 12 and 13 extend from the center of the base of the unit to the ends of the unit at angles of about 30° to the base. The plates have depressions in their central portions which contain the small circular air outlet openings 14. Dish-shaped back plates 15 and 16 are spaced from the plates 12 and 13 respectively, below the latter. Circular flexible diaphragms 18 and 19 which may be of cloth, rubber or a suitable plastic, are bolted at spaced points around their peripheries to the back plates 15 and 16 respectively, the diaphragms being aligned with the perforated central portions of their respective front plates 12 and 13, and being spaced around their peripheries from their respective front plates for permitting the passage of conditioned air to the air outlet openings 14.

The back plates 15 and 16 have the central openings 20 and 21 respectively, for admitting conditioned air under pressure into the chambers between the diaphragms and the back plates, which back plates have orifices therein which are connected by the tubes 22 and 23 respectively, to the valve 25 which contains a horizontextending bore 26 which is intersected by the two smaller vertically extending spaced-apart bores 27 which pass through the bore 26 to one side of the center thereof. The upper ends of the tubes 22 and 23 are lined-up with the bores 27 and are connected to the lower ends of the latter. The bore 26 has a shaft 28 rotatably supported therein, the shaft being cylindrical except where it passes through the bores 27 at which locations it has cutaway flattened sides which can be lined-up with sides of the bores 27, as illustrated by Fig. 4, so as not to obstruct the bores 27. The shaft 28 can be rotated as will be described, to variably throttle the bores 27. The shaft 28 is connected at its ends to the plates 29 which are attached to the pressure responsive flap 30, the latter being pivoted for rotation about the shaft 28. The counter-weight 31 is attached to the threaded shaft 32 which is threaded into the plate 33 which extends between the plates 29 on the opposite side of the shaft 28 from the flap 30, and can be adjusted for varying the sensitivity of the volume control.

The inner ends of the bleeder tubes 32 and 33 are lined-up with and are connected to the upper ends of the bores 27. The outer ends of the bleeder tubes 32 and 33 are open to the atmosphere, and are inturned towards each other on opposite sides of the reed 34 of the room thermostat T.

The air distributing unit has the mixing chamber 38 in which the warm and cool air streams are mixed. The upper portion of the chamber 38 has the horizontally extending partitions 39 therein which form a labyrinth through which the air has to pass before it can be discharged from the upper air outlet grille 40. The labyrinth adds sufficient resistance that air volume changes cause air pressure changes which act on the flap 30.

*Operation of Figs. 1–4*

When the thermostat reed 34 is midway between the outer ends of the bleeder tubes 32 and 33, equal volumes of air from behind the warm and cool air diaphragms 18 and 19 respectively, are bled to the atmosphere. When the room thermostat T calls for heat, its reed 34 is moved nearer the outer end of the bleeder tube 33 and further from the bleeder tube 32, resulting in less air being bled from behind the cool air diaphragm 19, and in more being bled from behind the warm air diaphragm 18. This results in more air pressure being built up behind the cool air diaphragm forcing it nearer the air outlets 14 in the plate 13 and reducing the volume of air discharged through such openings, and results in a reduction in the air pressure behind the warm air diaphragm 18 permitting it to fall away from the air outlet openings in the plate 12, and permitting a larger volume of warm air to be discharged through the latter openings.

When the thermostat calls for cooling, its reed 34 moves nearer the outer end of the bleed tube 32 and further from the outer end of the bleed tube 33. This results in more air being bled from behind the cool air diaphragm 19, and in less air being bled from behind the warm air diaphragm 18. This results in a higher pressure being built up behind the warm air diaphragm and in less pressure being present behind the cool air diaphragm, and results in the warm air diaphragm 18 moving nearer its associated air outlets 14 in the plate 12, and in the cool air diaphragm 19 moving further from its associated air outlets 14 in the plate 13. This results in more cool air being discharged into the mixing chamber 38, and in less warm air being discharged into the mixing chamber.

Normally, the shaft 28 will be positioned to partially block both of the bores 27. If the volume of mixed air passing the flap 30 increases above normal, the resulting air pressure increase will cause the flap to move upwardly and to rotate the shaft 28 to cause it to block more of the bores 27, causing less air to be bled from behind both diaphragms so that the latter move towards their respective air outlet openings, reducing the volumes of warm and cool air supplied into the mixing chamber. If the volume of mixed air passing the flap 30 decreases below normal, the reduction in air pressure at the flap 30 will cause it to move downwardly and to rotate the shaft 28 to cause it to block less of the bores 27, causing more air to be bled from behind the warm and cool air diaphragms so that the latter move further away from their respective outlet openings 14, increasing the volumes of warm and cool air supplied into the mixing chamber.

*Description of Figs. 5–8*

Much of the apparatus of Figs. 4–8 is common to that of Figs. 1–4, and so will be given the same reference characters. Also, since many of the components of Figs. 5–8 operate in the same way as corresponding components of Figs. 1–4, they will not be described in detail.

The apparatus of Figs. 5–8 does not have a bleeder controlled by a room thermostat as in Figs. 1–4, and does not have a valve controlled by a flap as in the case of Figs. 1–4. Instead, it has a bleeder controlled by the flap, and a valve controlled by the room thermostat.

The valve 45 has the vertically extending bores 46 and 47 connected at their lower ends to the tubes 22 and 23 respectively, and having open upper ends terminating below the underside of the inner portion 49 of the pressure responsive flap 50 which is pivoted at 51 to the valve body. The flap portion 49 and the upper ends of the tubes 46 and 47 constituting a bleeder for bleeding air from behind the warm air diaphragm 18 and the cool air diaphragm 19, the volume of the bled volumes depending upon the position of the flap 50. Normally, the flap 50 will be in a mid-position providing a normal volume of bled air.

The body of the valve 45 has a horizontally extending bore extending through the bores 46 and 47 and containing a slidable rod 53 which is connected at one end to the bellows 54, and contacts at its other end one end of the coiled spring 55, the other end of which contacts the inner end of the adjusting screw 56 which is threaded into the valve body. The rod 53 contains the cross bores 64 and 65 which normally are positioned to be partially aligned with the bores 46 and 47 respectively, for partially obstructing and partially opening the latter. The rod 53 can be slidably positioned as shown by Fig. 8 to completely block off one of the bores 46 or 47 while permitting free flow through the other of the latter bores. The bellows 54 is enclosed by the housing 57 which is attached to the valve body. The space around the bellows is connected by the tube 58 to the thermostatic element 59 which is located in the space served by the air distributing unit. The element 59, the tube 58 and the bellows 54 are filled with a conventional motion transmitting liquid such as is commonly used with thermostats of this type.

The valve 45 is supported midway between the inner ends of the aligned partitions 67, the outer ends of which are attached to the ends of the unit. The constricted space between the inner ends of the partitions provides sufficient air resistance together with that of the air outlet 40, to cause a change in air volume to cause a pressure change sufficient to move the flap 50.

*Operation of Figs. 5–8*

Normally, constant volumes of air are bled from behind the warm and cool air diaphragms so that the volumes of warm and cool air supplied into the mixing chamber 38 are unchanged. If the thermostatic element 59 calls for heat, it will cause the bellows 54 to move the rod 53 so that the bores 64 and 65 are so positioned that more air is bled from behind the warm air diaphragm, and less air is bled from behind the cool air diaphragm. The decreased pressure behind the warm air diaphragm permits it to move further from its associated air outlet openings 14 in the plate 12, resulting in an increase in the volume of warm air supplied into the mixing chamber 38. The increased pressure behind the cool air diaphragm causes it to move closer to its associated outlet openings 14 in the plate 13, resulting in a decrease in the volume of cool air supplied into the mixing chamber.

If the thermostatic element 59 calls for cooling, it will cause the bellows 54 to move the rod 53 so that the bores 64 and 65 are so positioned that less air is bled from behind the warm air diaphragm, and more air is bled from behind the cool air diaphragm. The increased pressure behind the warm air diaphragm causes it to move nearer its associated outlets 14 in the plate 12, resulting in a decrease in the volume of warm air supplied into the mixing chamber 38. The decreased pressure behind the cool air diaphragm permits it to move further from its associated outlets 14 in the plate 13, resulting in an increase in the volume of cool air supplied into the mixing chamber.

An increase in the volume of mixed warm and cool air passing the flap 50 will cause the latter to move upwardly, and to move its inner portion 49 nearer the upper ends of the bleed tubes 46 and 47 causing a reduction in the volumes of air bled from behind both diaphragms. This will cause both diaphragms to move nearer their respective outlet openings 14, resulting in a decrease in the total air volume supplied into the mixing chamber. A decrease in the volume of air passing the flap 50 will cause the latter to move downwardly, and to move its inner portion 49 further from the upper ends of the bleed tubes 46 and 47, causing an increase in the volumes of air bled from behind both diaphragms. This will cause the diaphragms to move further away from their respective air outlet openings 14, resulting in an increase in the total volume of air supplied into the mixing chamber.

It will have been observed that the flow of air used for control purposes passes through the volume control and the temperature control in series. In the embodiment of Figs. 1–4, the control air passes first through the volume control, and then through the bleeder comprising the thermostatic control. In the embodiment of Figs. 5–8, the control air passes first through the thermostatic control, and then through the bleeder comprising the volume control.

While embodiments of the invention have been described for the purpose of illustration, it should be understood that the invention is not limited to the exact apparatus and arrangement of apparatus illustrated, since modifications thereof may be suggested by those skilled in the art without departure from the essence of the invention.

What is claimed, is:

1. An air distributing unit comprising a first damper mechanism having a perforated front plate forming a warm air outlet, a back plate aligned with and spaced from said front plate, a flexible diaphragm secured at its edges to said back plate and spaced at its edges from said front plate, the spaces between said diaphragm edges and said front plate forming an air inlet for warm air to be dampered, said back plate being shaped to provide with said diaphragm a warm air chamber behind said diaphragm, said back plate having an opening therein for admitting warm air under pressure to force said diaphragm forwardly towards said front plate; means for supplying warm air under pressure to be dampered between said front plate and said diaphragm edges, and for supplying air under pressure into said last opening; said back plate having a first orifice for permitting the escape of air chamber from said chamber, a second damper mechanism having a second perforated front plate forming a cool air outlet, a second back plate aligned with and spaced from said second front plate, a second flexible diaphragm secured at its edges to said second back plate and spaced at its edges from said second front plate, the spaces between said second diaphragm edges and said second front plate forming an air inlet for cool air to be dampered, said second back plate being shaped to provide with said cool diaphragm a second air chamber behind said second diaphragm, said second back plate having an opening therein for admitting cool air under pressure to force said second diaphragm towards said second front plate; means for supplying cool air under pressure to be dampered between said second front plate and said second diaphragm edges, and for supplying cool air under pressure into said last mentioned opening; said second back plate having a second orifice therein for the escape of air from said second chamber; a bleeder for bleeding the air from said orifices; first and second valve means for varying the volumes of air supplied from said first and second orifices respectively, to said bleeder; first and second air flow means connecting said first and second orifices respectively, and said first and second valve means respectively, in series to said bleeder; means for simultaneously adjusting said first and second valve means for increasing the volume of air supplied by one of said valve means to said bleeder and decreasing the volume of air supplied by the other of said valve means to said bleeder, and means for adjusting said bleeder for varying the volume of air bled therefrom.

2. An air distributing unit as claimed in claim 1 in which an air temperature responsive control and an air volume responsive control are provided, and in which one of said controls is connected to said valve means adjusting means and the other of said controls is connected to said bleeder adjusting means.

3. An air distributing unit as claimed in claim 1 in which the valve adjusting means includes a rotary shaft, in which a volume responsive control is pivoted to said shaft, and in which a temperature responsive control is connected to said bleeder adjusting means.

4. An air distributing unit as claimed in claim 1 in which a temperature responsive control is provided, in which the valve adjusting means includes a slidably positioned shaft connected to said control, said control moving said shaft in one direction upon temperature increases and moving said shaft in the other direction when temperature decreases occur, and in which an air volume responsive control is provided and connected to said bleeder adjusting means.

References Cited in the file of this patent

UNITED STATES PATENTS

| 510,017   | Gassett     | Dec. 5, 1893  |
| 1,949,030 | Stockmeyer  | Feb. 27, 1934 |
| 2,507,621 | Branson     | May 16, 1950  |
| 2,517,056 | Trubert     | Aug. 1, 1950  |
| 2,641,986 | Arthur      | June 16, 1953 |
| 2,710,724 | McMahon     | June 14, 1955 |

FOREIGN PATENTS

| 213,394 | Great Britain | Apr. 3, 1924 |